United States Patent
Kapinos et al.

(10) Patent No.: US 7,416,421 B2
(45) Date of Patent: Aug. 26, 2008

(54) ENCLOSURE WITH INTEGRAL SNAP ACTING MOUNTING FEET

(75) Inventors: Robert Kapinos, Middleton, WI (US); David Updike, Madison, WI (US); Yajun Yang, Madison, WI (US); Troy Schwenn, Verona, WI (US)

(73) Assignee: Automation Components, Inc., Middleton, WI (US)

( * ) Notice: Subject to any disclaimer, the term of this patent is extended or adjusted under 35 U.S.C. 154(b) by 45 days.

(21) Appl. No.: 11/496,170

(22) Filed: Jul. 31, 2006

(65) Prior Publication Data

US 2008/0026631 A1    Jan. 31, 2008

(51) Int. Cl.
*H01R 4/66* (2006.01)
(52) U.S. Cl. ........................................................ 439/94
(58) Field of Classification Search ................. 439/716, 439/532, 94, 576
See application file for complete search history.

(56) References Cited

U.S. PATENT DOCUMENTS

| | | | |
|---|---|---|---|
| 4,111,517 A * | 9/1978 | Debaigt | 439/716 |
| 4,113,982 A * | 9/1978 | Glaesel | 174/158 R |
| 4,900,275 A | 2/1990 | Fasano | |
| 4,921,445 A | 5/1990 | Herbert | |
| 5,192,227 A * | 3/1993 | Bales | 439/532 |
| 5,602,363 A | 2/1997 | Von Arx | |
| 5,704,805 A | 1/1998 | Douty et al. | |
| 5,857,799 A | 1/1999 | Blake, III | |
| 5,907,476 A | 5/1999 | Davidsz | |
| 6,431,909 B1 | 8/2002 | Nolden et al. | |

OTHER PUBLICATIONS

Winford Engineering, DIN Rail Mounting Clips, www.winfordeng.com.
B&B Electronics Manufacturing Company, DIN Rail Adapter Clip, www.bb-elec.com.
Erlich Industrial Development Corp., DIN Rail Mounting Clips, www.eidusa.com.
Veris Industries, DIN Rail Clips, www.veris.com.
N-Tron, Metal DIN-Rail Clip, www.n-tron.com.
NK Technologies, DIN Rail Adapter, www.tequipment.net.
Scidyne, Mounting Track System and Accessories, www.scidyne.com.
Cognex, DIN Rail Adapter, www.cognex.com.
ERNI Elektroapparate GmbH, DIN Rail Mount Enclosure IDG-A, www.erni.com p. 1-8.

(Continued)

*Primary Examiner*—Phuong K Dinh
(74) *Attorney, Agent, or Firm*—Ryan Kromholz & Manion S.C.

(57) ABSTRACT

An enclosure with integral snap-acting mounting feet for mounting a unit, such as a sensor, to a DIN rail. The unit includes a component portion and a mounting portion. The component portion is the sensor or other apparatus. The mounting portion is integrally formed to the component portion through a flexible hinge portion. The mounting portion includes a tab formed on either side of the mounting portion, and a mounting foot integrally formed to each tab. The flexible hinge portion allows the operator to easily snap the unit onto a DIN rail. The unit is then removed from the DIN rail by pulling on either of the tabs, which causes the hinge portion to flex and allows the mounting foot to be disengaged from the DIN rail.

20 Claims, 2 Drawing Sheets

OTHER PUBLICATIONS

DRC, DIN Rail Adapter Clip, www.act-solutions.com Advanced Control Technologies, Inc., DRC Specifications, P/D 010804, p. 1-2.

Diamond Polymers, Inc., Material Property Data Sheet, Diamaloy 750 ABS/PC Alloy Non-Halogen Flame Re-tardant, EAP/Apr. 30, 2003.

Phoenix Contact CmbH & Co. KG, www.phoenixcontact.com, Jun. 28, 2005.

Mouser Electronics, Phoenix Contact DIN Rail Circuit Breakers, www.mouser.com/phoenix.

Altech Corp., End Stops, Mounting Feet, www.alliedelec.com, product datasheet p. 63.

McMaster-Carr, DIN-Rail Circuit Breakers, www.mouser.com, catalog p. 689.

Industrial Enclosures, DIN Rail Clips, www.industrial-enclosures.com.

* cited by examiner

ENCLOSURE WITH INTEGRAL SNAP ACTING MOUNTING FEET

BACKGROUND OF THE INVENTION

The present invention relates generally to the field of securest structures for securing components to a standard support rail.

Conduit and rail structures are frequently used to mount electrical components in enclosures. One popular system of this type uses a standard set of flanged rails that can be cut to a desired length and attached to the interior of an enclosure. These rails are commonly referred to as DIN rails. DIN rails have either inwardly or outwardly projecting raised flanges along their length for receiving components. The components may include a wide array of modular elements such as terminal blocks, input/output modules, dip switched, small motor drives, contactors, circuit breakers, current sensors, overload relays, communication/control modules, and so on. Each of the components features structures designed to interface with the DIN rail flanges to hold the components securely in place.

Previous components have required a mounting foot or mounting clips to be attached to the component prior to attaching the component to the DIN rail. There is extra cost involved in manufacturing these extra parts, and in the time required to assemble these parts. Further, there is more room for error and failure when manufacturing extra parts.

There is a need, therefore, for an improved arrangement for mounting components along DIN rails wherein the component and the connection portion are integrally formed, thereby decreasing the number of parts and the time required to install the component. It is further desired to design a component which can be easily installed and removed from a DIN rail.

SUMMARY OF THE INVENTION

The invention provides an enclosure with an integral snap-acting DIN rail mounting feet. The invention includes a component portion and a mounting portion. The mounting portion is integrally formed to the component portion via a flexible hinge. The mounting portion includes a pair of tabs and a pair of mounting feet. Each tab is connected to one of the mounting feet. The mounting feet are adapted to engage the DIN rail. The enclosure can be removed from the DIN rail by lifting up on either one of the tabs. This causes the hinge portion to flex, and the enclosure can be lifted off the DIN rail.

DESCRIPTION OF THE PREFERRED EMBODIMENTS

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
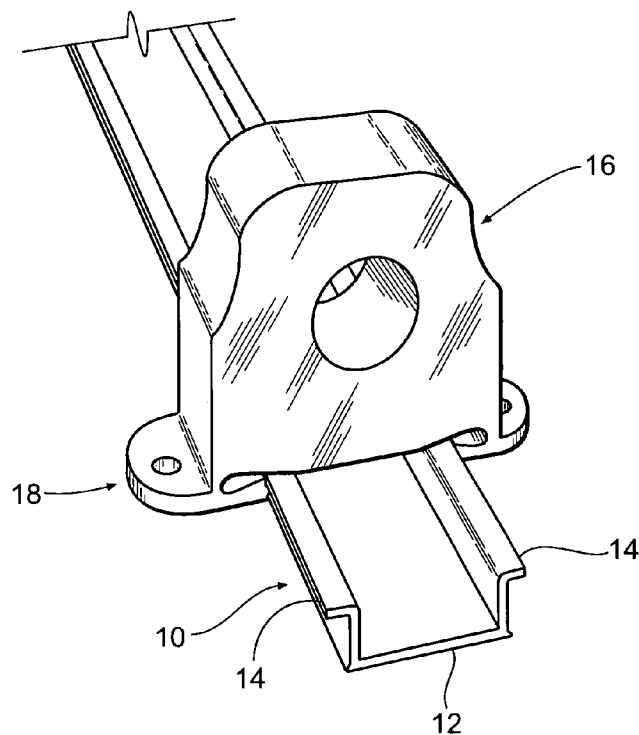
FIG. 1 is a perspective view of a unit according to the present invention mounted on a DIN rail.

FIG. 1 shows a perspective view of a DIN rail 10 assembly having a base 12 and two flanges 14. Each flange 14 extends outwardly in an inverted L-shape from opposite sides of the base 12. A current sensor enclosure 16 is coupled to the DIN rail 10 via a mounting portion 18 of the current sensor enclosure 16. The mounting portion 18 of the current sensor enclosure 16 is configured such that the enclosure 16 can be snapped on and off of the DIN rail 10 as will be discussed further below.

Figure 2:
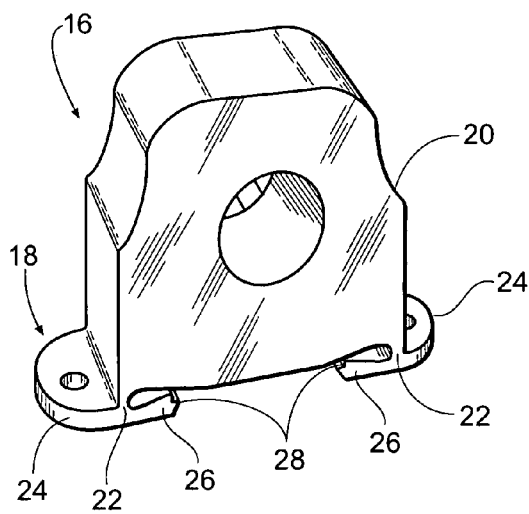
FIG. 2 is a perspective view of a unit according to the present invention.

FIG. 2 shows a front view of a preferred embodiment of a solid core enclosure 16 according to the present invention. The enclosure 16 includes the component portion 20 and a mounting portion 18. The component portion 10 in the preferred embodiment is a current sensor; however as will be discussed below, any component which would be mounted to a DIN rail 10 could be utilized. The mounting portion 18 is integrally formed to the component portion 20 through a flexible hinge portion 22.

The mounting portion 18 includes two tabs 24, one on either side of the hinge portion 22. The tabs 24 extend outwardly from the hinge portion 22. The tabs 24 can be of any shape, however in the preferred embodiment, the tabs have a semi-circular shape.

The mounting portion 18 further includes two mounting feet 26. The mounting feet 26 are integrally formed to the hinge portion 22, and extend inwardly from the hinge portion 22. In this manner, the mounting feet 26 are located generally underneath the component portion 20. The mounting feet 26 are generally rectangular in shape. A ledge 28 is formed on the free end of each mounting foot.26. This ledge 28 is adapted to engage the inverted L-shaped flange 14 of the DIN rail 10 as is best shown in FIGS. 4-6.

The hinge portion 22 allows the mounting portion 18 to be movable with respect to the component portion 20. The enclosure 16 is made of a flexible plastic material. The enclosure 16 could be made of any plastic material which is flexible enough to allow the hinged portion 22 to flex adequately. The preferred material is an ABS/Polycarbonate blended material, such as Diamaloy 750®.

Figure 4:
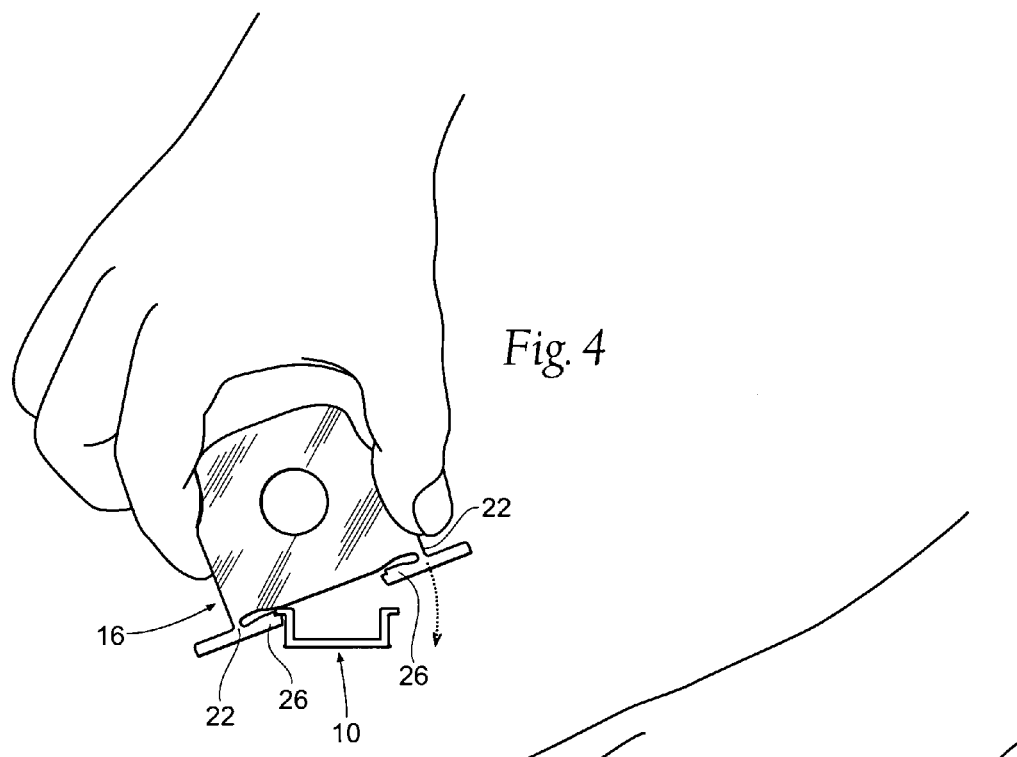
FIG. 4 is a front view showing a unit according to the present invention being mounted on a DIN rail.

As shown in FIG. 4, in use, the enclosure 16 is attached to a DIN rail 10 by engaging a first mounting foot 26 on a first flange 14 of the DIN rail 10. The user then pushes the enclosure 16 towards the DIN rail 10. The free end of the mount foot 26 is angled. In this manner, as the angled surface of the mounting foot 26 engages the flange 14, the angled surface acts as a cam and the hinged portion 22 is allowed to flex. This flexure allows the mounting foot 26 to temporarily move to accommodate the flange 14. After the mounting foot 26 is pushed past the flange 14, the flexed hinge portion 22 snaps back to its original form.

Figure 3:
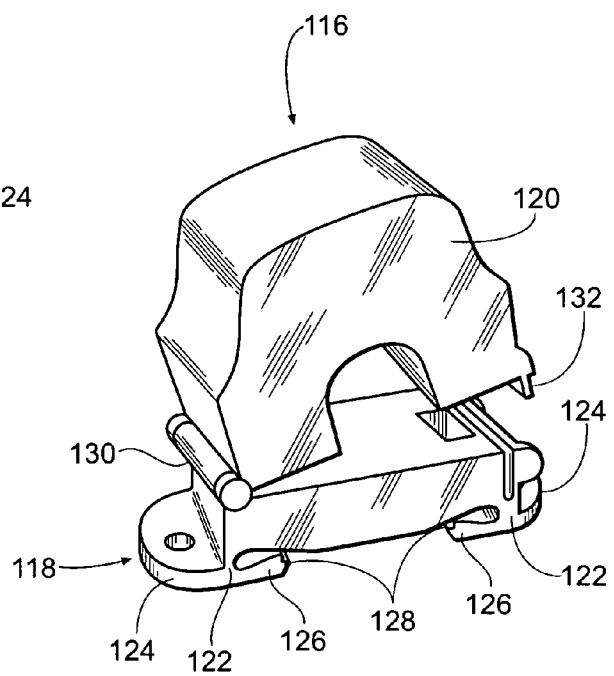
FIG. 3 is a perspective view of a second embodiment of a unit according to the present invention.
Figure 5:
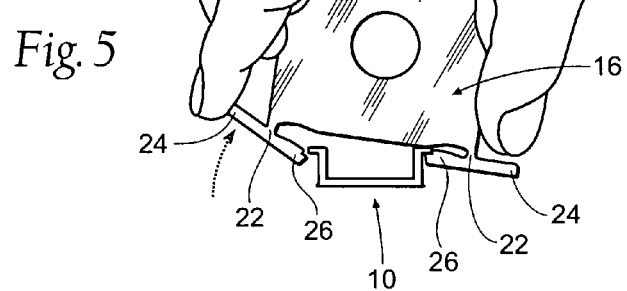
FIG. 5 is a front view showing a unit according to the present invention being dismounted from a DIN rail with the bending action of the hinge exaggerated.
Figure 6:
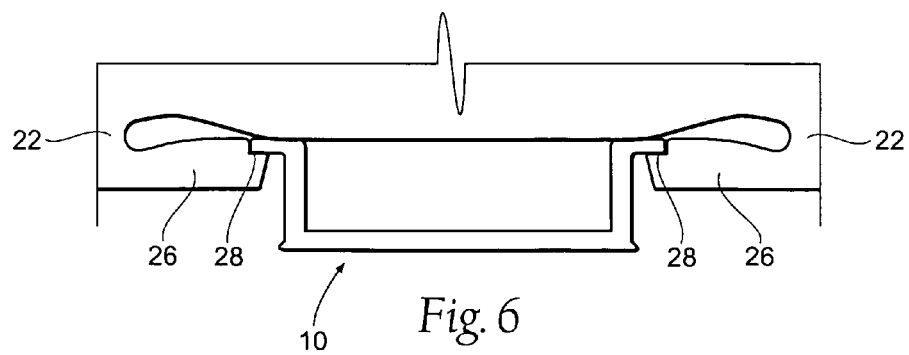
FIG. 6 is a partial front view of a unit according to the present invention mounted on a DIN rail.

As shown in FIG. 5, to remove the enclosure 16, the operator lifts up on either one of the tabs 24. This causes the hinge 22 to flex, and the mounting foot 26 attached to the tab 24 to disengage from the DIN rail 10. The enclosure 16 can then be pulled up so that the opposite mounting foot 26 is disengaged from the DIN rail 10. In this manner, the enclosure 16 can be removed from the DIN rail 10 by hand, without the use of any tools An alternate embodiment of the present invention is shown in FIG. 3. This embodiment is a split-core enclosure 116. The function of the mounting portion 118 is the same, however, the component portion 120 includes a component hinge 130 and a component clasp 132. This is pointed out to illustrate that the component portion 120 of the present invention may take any configuration.

The preferred embodiment discloses an integrally formed snap on current sensor enclosure 16. However, the invention could be applied to any other type of enclosure unit 16 which may be attached to a DIN rail 10. For example, and not by way of limitation, the invention could be applied to a terminal block, an input/output module, a dip switch, a small motor drive, a contactor, a circuit breaker, an overload relay, a communication/control module, and so on.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. An apparatus configured for a mounting rail, the mounting rail having first and second mounting flanges extending lengthwise along opposite sides of a support section, the apparatus comprising:
   a component portion, said component portion having a top surface and a bottom surface;
   a mounting portion, said mounting portion including a first hinge and a second hinge, a first mounting foot and a second mounting foot, the first mounting foot coupled to the first hinge and the second mounting foot coupled to the second hinge, a first mounting tab and a second mounting tab, the first mounting tab coupled to the first hinge and the second mounting tab coupled to the second hinge;
   wherein each hinge is integrally formed to the bottom surface of the component portion and extends outward from the bottom surface of the component portion generally perpendicular to the bottom surface of the component portion; and
   wherein said first mounting tab extends from said first hinge in a first direction and said second mounting tab extends from said second hinge in a second direction, said first mounting tab and said second mounting tab extending generally parallel to said component portion bottom surface, said mounting tabs being sized and configured such that they do not extend under the component portion bottom surface.

2. The apparatus of claim 1 wherein said component portion is a current sensor.

3. The apparatus of claim 1 wherein said component portion is a terminal block.

4. The apparatus of claim 1 wherein said component portion is a circuit breaker.

5. The apparatus of claim 1 wherein said component portion is an electrical component.

6. The apparatus of claim 1 wherein a ledge is formed on each mounting foot.

7. The apparatus of claim 1 wherein each of said mounting feet further includes a free end and a fixed end, wherein the fixed end of the first mounting foot is connected to the first hinge portion and the fixed end of the second mounting foot is connected to the second hinge portion.

8. The apparatus of claim 7 wherein each free end includes a cam surface adapted to engage said mounting flange of one of said mounting rails.

9. The apparatus of claim 7 wherein the component portion has a first width at the bottom surface of the component portion, said first width being greater than the distance between the free ends of the mounting feet.

10. The apparatus of claim 1 wherein each mounting tab is sized and configured to rotate from a first position to a second position, said second position being generally perpendicular to said first position.

11. The apparatus of claim 1 wherein at least one of the mounting tabs is formed with an aperture therethrough.

12. The apparatus of claim 1
   wherein the first mounting tab extends in a first direction from first hinge and the first mounting foot extends from the first hinge in a third direction, the third direction being generally opposite the first direction;
   and the second mounting tab extends in a second direction from the second hinge and the second mounting foot extends in a fourth direction from the second hinge, the second direction being generally opposite the fourth direction.

13. The apparatus of claim 12 wherein the mounting feet extend under the component portion.

14. The apparatus of claim 1 wherein
   the first mounting tab extends in a first direction from first hinge and the first mounting foot extends in a third direction from the first hinge, the third direction and the first direction being not the same;
   and the second mounting tab extends in a second direction from the second hinge and the second mounting foot extends in a fourth direction from the second hinge, the second direction and the fourth direction being not the same.

15. The apparatus of claim 1 wherein an upward force applied to the first mounting tab pivots the first mounting foot downwardly about the first hinge.

16. The apparatus of claim 15 wherein an upward force applied to the second mounting tab pivots the second mounting foot downwardly about the second hinge.

17. The apparatus of claim 1 wherein the bottom surface of the component portion has a first end and a second end and the first hinge is formed at the first end of the component portion and the second hinge is formed at the second end of the component portion.

18. An apparatus configured for a mounting rail, the mounting rail having first and second mounting flanges extending lengthwise along opposite sides of a support section, the apparatus comprising:
   a component portion, said component portion having a top surface and a bottom surface;
   a mounting portion, said mounting portion including a first hinge and a second hinge, a first mounting foot and a second mounting foot, the first mounting foot coupled to the first hinge and the second mounting foot coupled to the second hinge, a first mounting tab and a second mounting tab, the first mounting tab coupled to the first hinge and the second mounting tab coupled to the second hinge;
   wherein each hinge is integrally formed to the bottom surface of the component portion and extends outward from the bottom surface of the component portion generally perpendicular to the bottom surface of the component portion; and wherein said first mounting tab extends from said first hinge in a first direction and said second mounting tab extends from said second hinge in a second direction, said mounting tabs being sized and configured such that they do not extend under the component portion bottom surface.

19. The apparatus of claim 18 wherein said first mounting foot has a free end and an opposed fixed end, the fixed end being coupled to the first hinge, and the free end being formed with a ledge, said ledge being sized and configured for engaging a mounting rail flange; and said second mounting foot has a free end and an opposed fixed end, the fixed end being coupled to the second hinge and the free end being formed with a ledge, said ledge being sized and configured for engaging a mounting rail flange.

20. An apparatus configured for a mounting rail, the mounting rail having first and second mounting flanges extending lengthwise along opposite sides of a support section, the apparatus comprising:

a component portion, said component portion having a top surface and a bottom surface;

a mounting portion, said mounting portion including a first hinge and a second hinge, a first mounting foot and a second mounting foot, the first mounting foot coupled to the first hinge and the second mounting foot coupled to the second hinge, a first mounting tab and a second mounting tab, the first mounting tab coupled to the first hinge and the second mounting tab coupled to the second hinge;

wherein each hinge is integrally formed to the bottom surface of the component portion and extends outward from the bottom surface of the component portion generally perpendicular to the bottom surface of the component portion; and wherein said first mounting foot extends from said first hinge in a first direction and said second mounting foot extends from said second hinge in a second direction, said mounting feet being sized and configured such that they extend under the component portion bottom surface.

* * * * *